Aug. 17, 1954     L. SCHWEIKERT     2,686,310
WELDER'S GOGGLES
Filed July 18, 1952
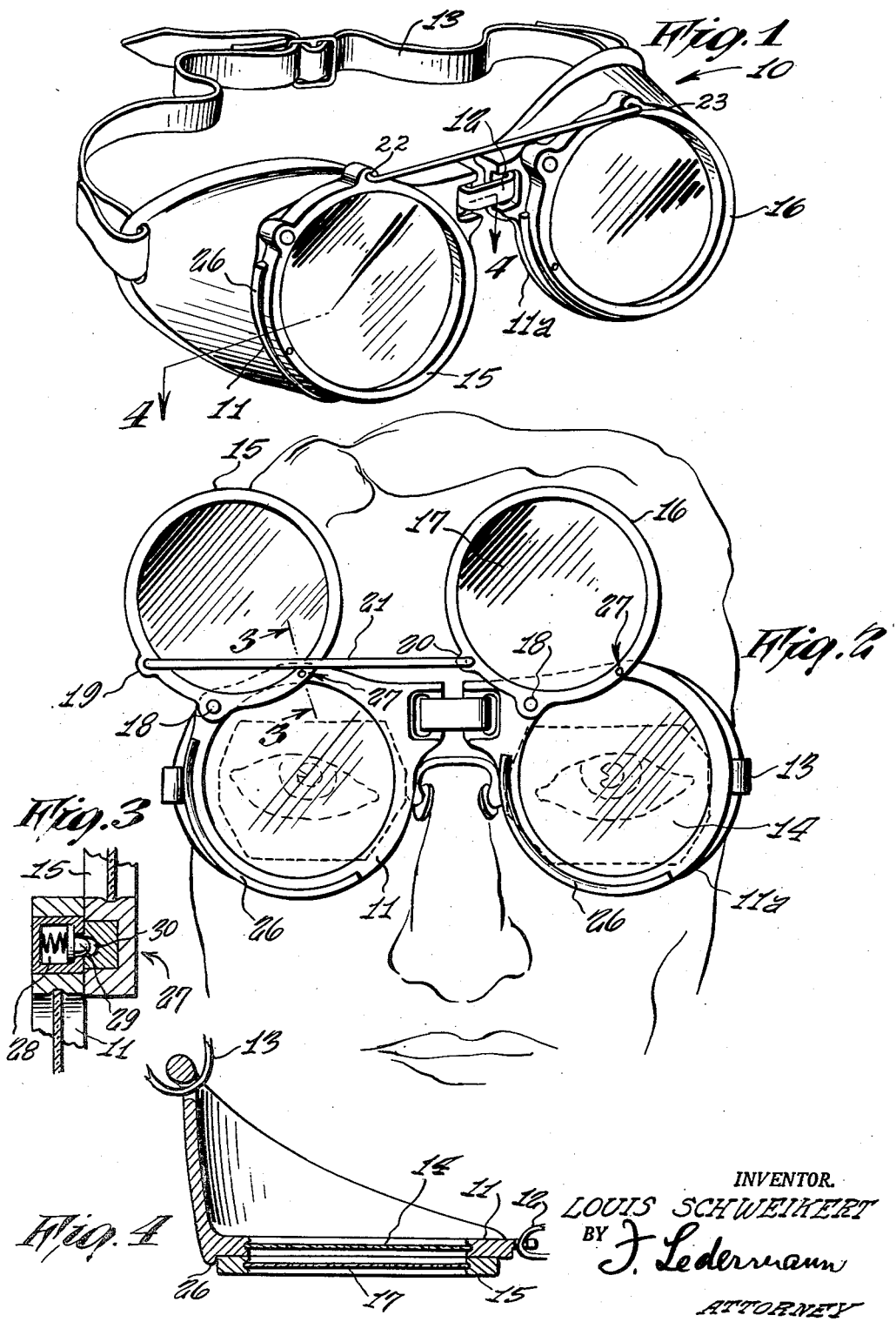
INVENTOR.
LOUIS SCHWEIKERT
BY J. Ledermann
ATTORNEY Patented Aug. 17, 1954

2,686,310

UNITED STATES PATENT OFFICE 2,686,310

WELDER'S GOGGLES

Louis Schweikert, Brooklyn, N. Y.

Application July 18, 1952, Serial No. 299,651

3 Claims. (Cl. 2—14)

This invention relates to goggles such as are used by welders, and the main object of the invention is the provision of certain new and useful improvements whereby the goggles may be easily and readily converted from dark glasses to clear glasses without having to lift or in any way tilt the frame of the goggles. Although goggles embodying the improvements of this invention are particularly convenient for persons who normally wear eyeglasses, they may also be used by all persons.

The above broad as well as additional and more specific objects will be clarified in the following description wherein characters of reference refer to like-numbered parts in the accompanying drawing. It is to be noted that the drawing is intended solely for the purpose of illustration and that it is therefore neither desired nor intended to limit the invention to any or all of the exact details of construction or operation shown or described, except insofar as they may be deemed essential to the invention.

Referring briefly to the drawing, Fig. 1 is a perspective view of a pair of welder's goggles embodying the instant invention and as they appear when the user is welding.

Fig. 2 is a front view of the same, showing how the goggles are worn and how they are operated to clear the dark glasses from the vision of the operator when he is not welding.

Fig. 3 is a sectional view taken on the line 3—3 of Fig. 2.

Fig 4 is a sectional view taken on the line 4—4 of Fig. 1.

Referring in detail to the drawing, the numeral 10 indicates a pair of goggles including two rims 11 and 11a linked by a nose piece 12 and connected in the usual manner by an adjustable strap 13 adapted to be passed around the head of the wearer, over the ears. The rims 11 and 11a hold clear glass lenses 14.

A second set of substantially similar rims 15 and 16 is provided, each of which holds a dark glass lens 17. The rim 15 is secured to the rim 11 by means of a pivot pin 18 positioned substantially intermediate the upper left-hand quadrant of the rim 11. In the same way the rim 16 is pivoted to the rim 11a by a similarly positioned pin 18. An eyelet 19 is formed on the rim 15 about a half-quadrant from the pin 18 thereon, in a clockwise direction, and a similar eyelet 20 is similarly provided on the rim 16. A cross arm 21 is pivotally joined to the two rims 15 and 16 as follows.

The cross arm 21 may comprise a rod or bar or a straight length of stout wire, being provided at its extremities with parallel right-angled deformations or pins 22 and 23 at right angles to the arm, which register respectively in the eyelets 19 and 20. No means is shown for locking these pins against falling or being pulled out of the eyelets, as such provision is common, but it is understood that such means would be provided.

Normally the rims 15 and 16 are superimposed over the rims 11 and 11a, respectively, and since gravity urges the former to swing clockwise about their pivots 18, limit stops are provided to maintain them, thus superimposed on the rims 11 and 11a. These stops are shown at 26, each rim 11 and 11a having one in the form of an arcuate ridge occupying at least a portion of the lower half of the rim and being preferably molded to the rim as a part thereof. Fig. 1 shows the rims 15 and 16 thus superimposed on the rims 11 and 11a, and this is the position of the former while the user is welding.

Usually the user swings his goggles up on his forehead when he finishes welding to look through the clear lenses 14. However, when the user normally wears eyeglasses this is impractical and inconvenient, as may well be imagined. In the case of the present invention, to achieve the same object the user merely grasps either rim 15 or 16 or the arm 21 and swings it upward arcuately, with the pivots 18 serving as parallel or simultaneous axes, and whichever of these three parts he swings will carry with it the other two. When thus raised to the position of the rims 15 and 16 shown in Fig. 2, the user looks through the clear lenses 14, and if he wears eyeglasses the latter have not been disturbed.

A releasable stop or catch 27 is shown for each rim 15 and 16, although theoretically the operation of the device will not be altered if only one such catch is provided. The catch 27 comprises a socket 28 in the rim 11 or 11a, having a spring propelled rounded or semispherical projection 29 normally urged outward and, when the rims 15 and 16 are positioned as shown in Fig. 2, into a recess 30 in the latter rim 15 or 16. As the rims 15 (or 16) approach their positions shown in Fig. 2 they depress the projections 29 and, upon positioning of the recesses 30 directly over them, the projections enter the recesses and releasably hold the rims in the raised positions shown. To bring them down again over the rims 11 and 11a, a slight pressure or force, only sufficient to press the projections out of the recess 30, will start the rims 15 and 16 swinging downward into the position shown in Fig. 1.

Obviously modifications in form or structure may be made without departing from the spirit or scope of the invention.

I claim:

1. The improvement in a pair of goggles having a pair of lens rims joined by a nose piece and lying substantially in a common plane, consisting in a second pair of substantially similar lens rims normally superimposed on said first rims and lying in a plane parallel to said first plane, each rim of said second pair being pivotally attached to one of said first rims on an axis positioned in the upper half of said first rims and substantially at right angles to said planes, each of said second rims having an eyelet thereon spaced from said axis, an arm having pins thereon registering in said eyelets whereby upon swinging of one of said second rims upward on its said axis said arm causes the other of said second rims also to swing upward on the said axis thereof, and a releasable catch partly on one of said first rims and partly on the corresponding one of said second rims for releasably retaining said second rims in upwardly swung position, said second rims being adapted to have dark lenses therein.

2. The improvement set forth in claim 1, each of said first rims having a forward projection thereon limiting the downward swinging of said second rims from said upwardly swung position to a position of superimposition on said first rims.

3. The improvement set forth in claim 1, said releasable catch comprising a spring projected rounded projection on said one of said first rims and a complementary recess on said corresponding of said second rims receptive of said projection.

References Cited in the file of this patent

UNITED STATES PATENTS

| Number | Name | Date |
|---|---|---|
| 1,677,089 | Hopewell | July 10, 1928 |
| 1,843,833 | Parsons | Feb. 2, 1932 |